(12) United States Patent
Wong

(10) Patent No.: US 8,195,779 B2
(45) Date of Patent: Jun. 5, 2012

(54) SYSTEM AND METHOD OF A MANAGEMENT INFORMATION BASE (MIB) AUTOCAST IN A COMMUNICATIONS NETWORK

(75) Inventor: David Wong, Campbell, CA (US)

(73) Assignee: Broadcom Corporation, Irvine, CA (US)

( * ) Notice: Subject to any disclaimer, the term of this patent is extended or adjusted under 35 U.S.C. 154(b) by 2785 days.

(21) Appl. No.: 10/292,697

(22) Filed: Nov. 13, 2002
(Under 37 CFR 1.47)

(65) Prior Publication Data

US 2004/0064538 A1 Apr. 1, 2004

Related U.S. Application Data

(60) Provisional application No. 60/413,766, filed on Sep. 27, 2002.

(51) Int. Cl.
*G06F 15/173* (2006.01)

(52) U.S. Cl. .......... 709/223; 709/220; 709/250
(58) Field of Classification Search .......... 709/223, 709/220, 250
See application file for complete search history.

(56) References Cited

U.S. PATENT DOCUMENTS

| 5,754,791 | A | * | 5/1998 | Dahlgren et al. | 709/242 |
| 5,862,311 | A | * | 1/1999 | Fujita | 714/4 |
| 6,067,619 | A | * | 5/2000 | Melvin et al. | 713/100 |
| 6,098,116 | A | * | 8/2000 | Nixon et al. | 710/8 |
| 6,122,669 | A | * | 9/2000 | Crayford | 709/232 |
| 6,292,801 | B1 | * | 9/2001 | Campbell et al. | 707/10 |
| 2002/0156837 | A1 | * | 10/2002 | Batke et al. | 709/203 |

* cited by examiner

*Primary Examiner* — Thuong Nguyen

(57) ABSTRACT

A network device includes a network port, at least one register, and a network information receiver. The network port is configured to send and receive data packets. The at least one register contains configuration data related to the network port. The network information receiver is coupled with the network port and is configured to receive the data packet from the network port, extract low level data from the data packet, and update the at least one register based on the low level data.

32 Claims, 6 Drawing Sheets

SYSTEM AND METHOD OF A MANAGEMENT INFORMATION BASE (MIB) AUTOCAST IN A COMMUNICATIONS NETWORK

REFERENCE TO RELATED APPLICATIONS

This application claims priority from U.S. Provisional Patent Application Ser. No. 60/413,766, filed Sep. 27, 2002. The contents of the provisional application are hereby incorporated by reference.

BACKGROUND OF THE INVENTION

1. Field of the Invention

This invention relates to systems and methods for a network device which employs a MIB frame for controlling devices connected to a network.

2. Description of the Related Art

Network management is required to handle special activities of initialization, termination, and monitoring of activities of devices within a network. Typically, network management is viewed as a distributed application which interacts with other management processes in the network to track packet transmission events in order to provide a basis for statistical analysis of the network operation with respect to each data network switch port. The network-management system typically includes of a manager, which executes the managing process. For example, the number of transmitted packets, received packets, and transmission collisions can be counted and polled periodically. These significant parameters, termed objects, are collected in a MIB, which is a collection of managed objects. Namely, objects are variables that hold information about the state of some process running on a network device or that include textual information about the device, such as a name and description. The managed object provides a means to identify, control, and monitor a network device.

Thus, the management information base (MIB) specifies the different counters, status events, alarms, and notification to be reported for each managed device. The MIB may be different for different devices contained within the network. Through the use of statistical counters, a determination of an improperly functioning device can be made, such as a device that is dropping data packets. The MIB counters contain all the per port statistic which are updated periodically by the network device.

Depending upon the network management protocol employed, the network management console must continually or periodically poll the agents to obtain information and store the information. A Simple Network Management Protocol (SNMP) is an example of a protocol that requires continual polling, and Remote Monitoring (RMON) is an example of periodic polling. Nevertheless, the process of gathering this information not only increases network traffic, but also places a large burden on the network management console. Furthermore, the hardware and software required to support conventional statistical collection protocols, such as SNMP, tend to increase the cost to produce these network devices. For instance, a device which utilizes an SNMP typically requires a central processing unit (CPU) to control the interpretation and execution of instructions related to the statistical information collected, and to control the control operations and monitoring functions of the device. However, as discussed above, the inclusion of components such as a CPU can increase the cost of a MIB device.

Therefore, a need exists to provide a cost-effective MIB device that is capable of gathering statistical information and controlling a MIB device.

SUMMARY OF THE INVENTION

According to an embodiment of the invention, provided is a network device. The network device includes a network port, at least one register, and a network information receiver. The network port is configured to send and receive data packets. The at least one register contains configuration data related to the network port. The network information receiver is coupled with the network port and is configured to receive the data packet from the network port, extract low level data from the data packet, and update the at least one register based on the low level data.

According to another embodiment of the invention, provided is a method of configuring a network device. The method includes a generating step, a receiving step, an updating step and a controlling step. The method generates a data packet containing network device configuration information and sends the data packet to the network device. The method receives the data packet and extracts the network device configuration information. The method updates register data based on the network configuration information. Furthermore, the method controls the network device configuration according to said register data.

According to another embodiment of the invention, provided is a network device. The network device includes a port, a data storage means and an information receiving means. The port sends and receives input data. The data storage means contains configuration data related to the port. The information receiving means receives a data packet from the port, wherein the information receiving means is configured to extract low level data from the data packet, and update at least one register based on the low level data.

BRIEF DESCRIPTION OF THE DRAWINGS

The objects and features of the invention will be more readily understood with reference to the following description and the attached drawings, wherein.

DETAILED DESCRIPTION OF THE PREFERRED EMBODIMENT

The invention provides, in one example, a MIB scheme that produces a control frame to assist a network device to control other devices connected to a network. In other words, the network device produces a control frame, which is transmitted from the network device to other devices connected to the network to instruct these devices to carry out or perform certain functions. In one embodiment, the invention is configured so that the network device does not require the support of some conventional SNMP protocol components, such as a CPU, in order for the device to monitor, collect, and control MIB statistical information.

For the purposes of the following discussion, the terms packet, data packet, traffic, and frame may be used interchangeably. According to a preferred embodiment of the invention, the network device may be an Ethernet switch, and accordingly, a packet may refer to an Ethernet frame as defined by IEEE 802.x and as modified herein. ATM (Asynchronous Transfer Mode) and other fixed cell length systems, as well as, other devices and packets may also be within the scope of the invention.

Embodiments of the invention herein may employ "push" technology for network information management reporting and configuration. In general, push technology is one by which a server, or data source, transmits information to a client, or data recipient, without a specific request for that information from the client. Push technology can employ unicast, multicast, broadcast, or a hybrid thereof. Push technology network devices may be used in both a small office/home office (SOHO) environment, a local area network (LAN), a wide area network (WAN), as well as in a more sophisticated enterprise, or global, network environment.

Figure 1:
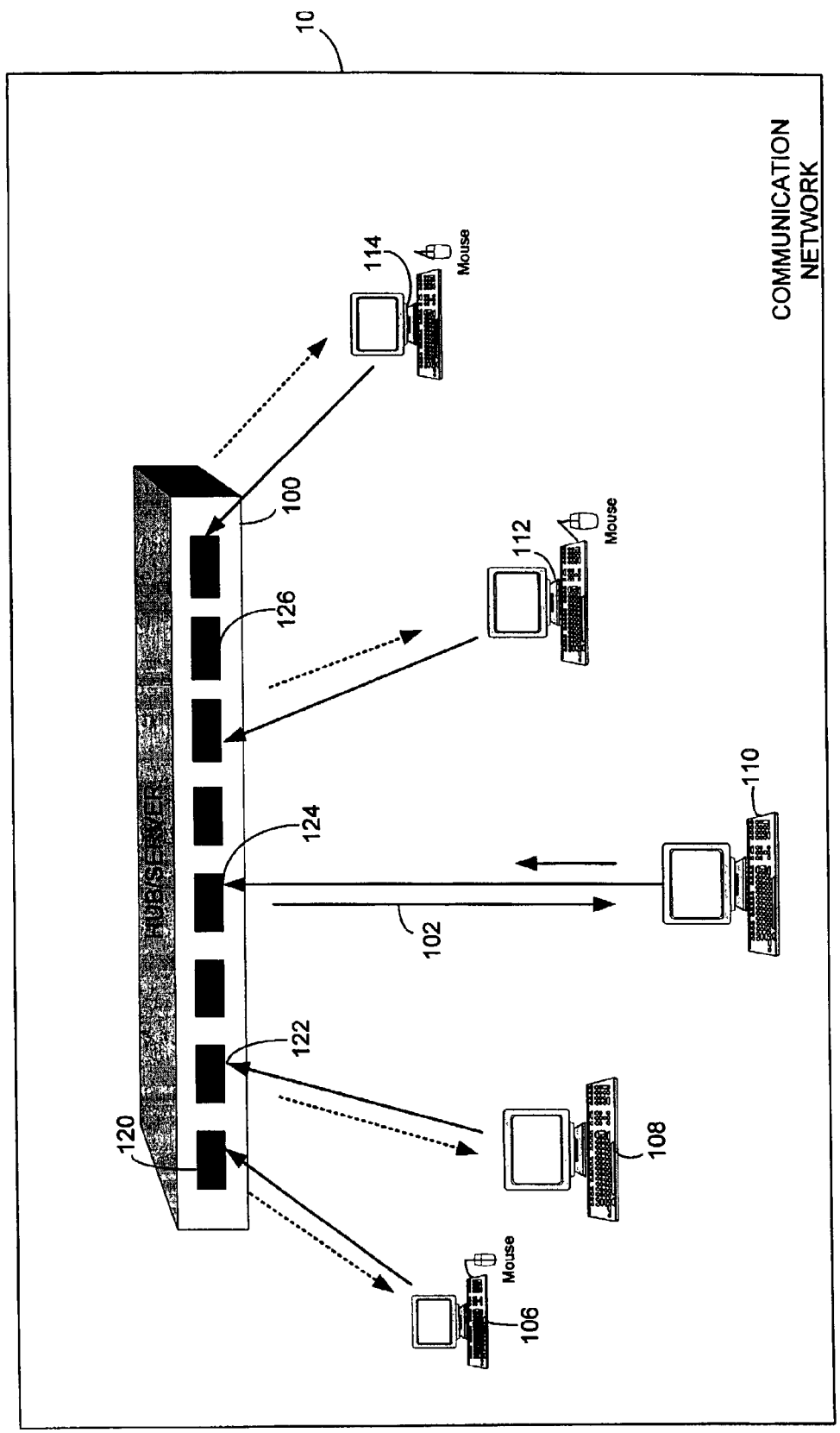
FIG. 1 is a block diagram of a network including a network device supporting MIB control frames in accordance with an embodiment of the invention.

FIG. 1 illustrates an embodiment of the invention. Network hub 100 transmits control information 102 to update any of the attached network devices, or stations, 106, 108, 110, 112, 114. Hub 100 can be any network device such as a switch, a repeater, a bridge, a router, a gateway, or a hybrid thereof. These transmissions can be limited either by transmitting only on specific ports such as 120, 122, 124, 126 of hub 100, or by having only the appropriate receiving device(s) such as 106, 108, 110, 112, 114 programmed to accept packets sent to a specific network address, while all other stations drop these packets. The control information 102, preferably in the form of packets, can be transmitted whenever an attached network device needs to be updated or reconfigured. These transmissions may be programmed so as not to cause any significant traffic loading on network 104. However, if a condition exists within network 104 such that an attached network device needs to be updated immediately, for example, if congestion arises, the network hub 100 may be configured to generate a frame, which can be assigned a priority level that enables the frame to be transmitted as soon as possible, and ahead of other lower priority frames.

Because the information is transmitted, it is not necessary for a processor or CPU to be included in hub device 100, in order to generate SNMP control instructions. This can reduce the complexity and the cost of the network hub 100. This embodiment can also move certain differentiation features of a conventional MIB device, from a network management responsibility, into the specialty software domain. A network application may be loaded onto device 110 (such as a PC) to assist a user with generating the control instructions. The user can use a data entry device, such as a keyboard, a touch-activated screen, or a voice-activated device, to enter the control instructions which may be displayed in a graphical user interface (GUI) window. By supporting a very simple set of commands, in one embodiment, this instruction controlling function can be turned ON or OFF, such that an external management entity such as station 10 can gain access to the network and generate the control instruction information whenever the control operations of a device connected to the network needs to be updated or modified.

For example, an application may provide one or more classes of menus or screen options to assist the user in generating the control instructions. Access to these menus may be restricted to particular entities, such as authorized technical personnel. For security reasons in network 104, it may be desirable to configure the network so that only one network device at a time, for example device 110, can update the control information of another network device. Since some control instructions may be programmed to write to another network device's hard drive or start another application, security may be a concern when accessing certain types of network devices. Therefore, the invention may include a security protection system. This security system, for example, may deny or limit access to certain network devices when attempts are made to change certain parameters of another network device. The invention may also impose a security clearance, which limits the level of access to certain network devices and monitors and regulates the types of information which can be changed by a particular network device.

Each network device may push configuration, operations or management data or instructions to hub 100 by the same means. Hub 100 may be configured to recognize these data or instructions and update the appropriate memory registers, tables, etc. that contain the configuration, operations or management data. As a result, hub 100 may be remotely configured by pushing data or instructions to it from a network client via a frame, which will be described in more detail below. Accordingly, a GUI interface may be utilized to build the frame and push the frame to hub 100. One having ordinary skill in the art will readily understand that many other methods of generating and pushing an MIB frame from client 110 to hub 100 may be employed.

Figure 2:
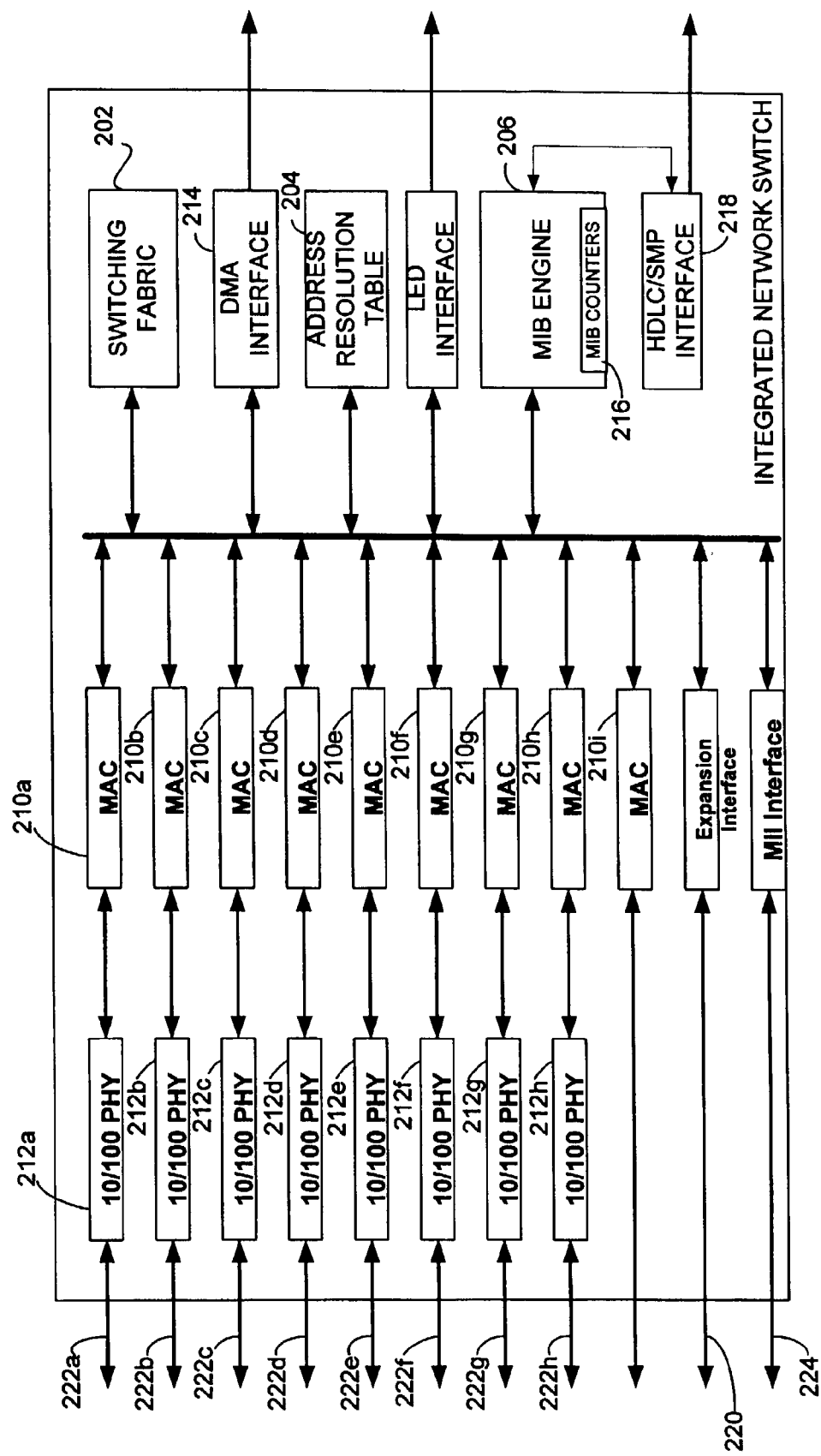
FIG. 2 is a block diagram of an embodiment of a network device which may be employed in the invention.

FIG. 2 shows a simple block diagram of an exemplary network device 200, according to an embodiment of the invention. Using an "MIB-Autocast" feature, network device 200 may generate and transmit control instructions or management data in a pre-selected format, for example, in a properly-formatted Ethernet frame, on a designated network port or ports. The data fields, or frames, can be intercepted, for example, by an external management probe, or a dedicated network management application, resident on a node within the network. Furthermore, network device 200 may receive configuration, operations or management data or instructions via a similar frame. Network device 200 may be configured to recognize and extract such data or instructions based on the frame, such as based on the destination address.

Device 200 may be a fully-integrated managed Layer 2 (L2) switch, which can incorporate all of the key functions to enable a system product based on the device to be targeted at the enterprise switch market, or alternatively, at the SOHO (Small Office Home Office) connectivity market or other markets.

Device 200 may integrate all of the major switching functions onto a single die, including switching fabric 202, address resolution logic 204, MIB engine 206, HDLC/SMP Interface 208, MAC 210, PHY 212, SSRAM interface 214 for external packet storage, as well as hardware counters 216 to support multiple industry-standard MIBs. In this example, switch device 200 maintains multiple per-port counters 216 for the key MIB attributes that can increment based on packet activity. These counters can be a combination of transmit, receive, and shared counters. The MIB Autocast feature allows the control instructions to be packed into a normal Ethernet frame.

It is desirable that MIB Autocast, management information be conveyed with minimal impact on the system. MIB Autocast frames can be captured and processed, stored, or analyzed as a background activity in any of the existing network nodes. It is desirable that MIB Autocast technique be configurable to forward information to any port or port group. This can include the ability to cast frames only at a local CPU, attached via the management port of choice. This technique can be used to off-load routine processor which supports the functions of MIB registers 216. MIB control registers 216 can collect, receive, generate, and transmit control instructions for each port. MIB control registers 216 can also provide direct hardware support for the EtherLike MIB, Bridge MIB, MIB 2 (interfaces) and selected groups of the RMON MIB.

The feature of casting data to output ports also may be programmable, and may be based on a port mask register within device 200. This allows each output port to be programmed individually as to whether the port will have MIB Autocast frame 400 queued to it.

Figure 3:
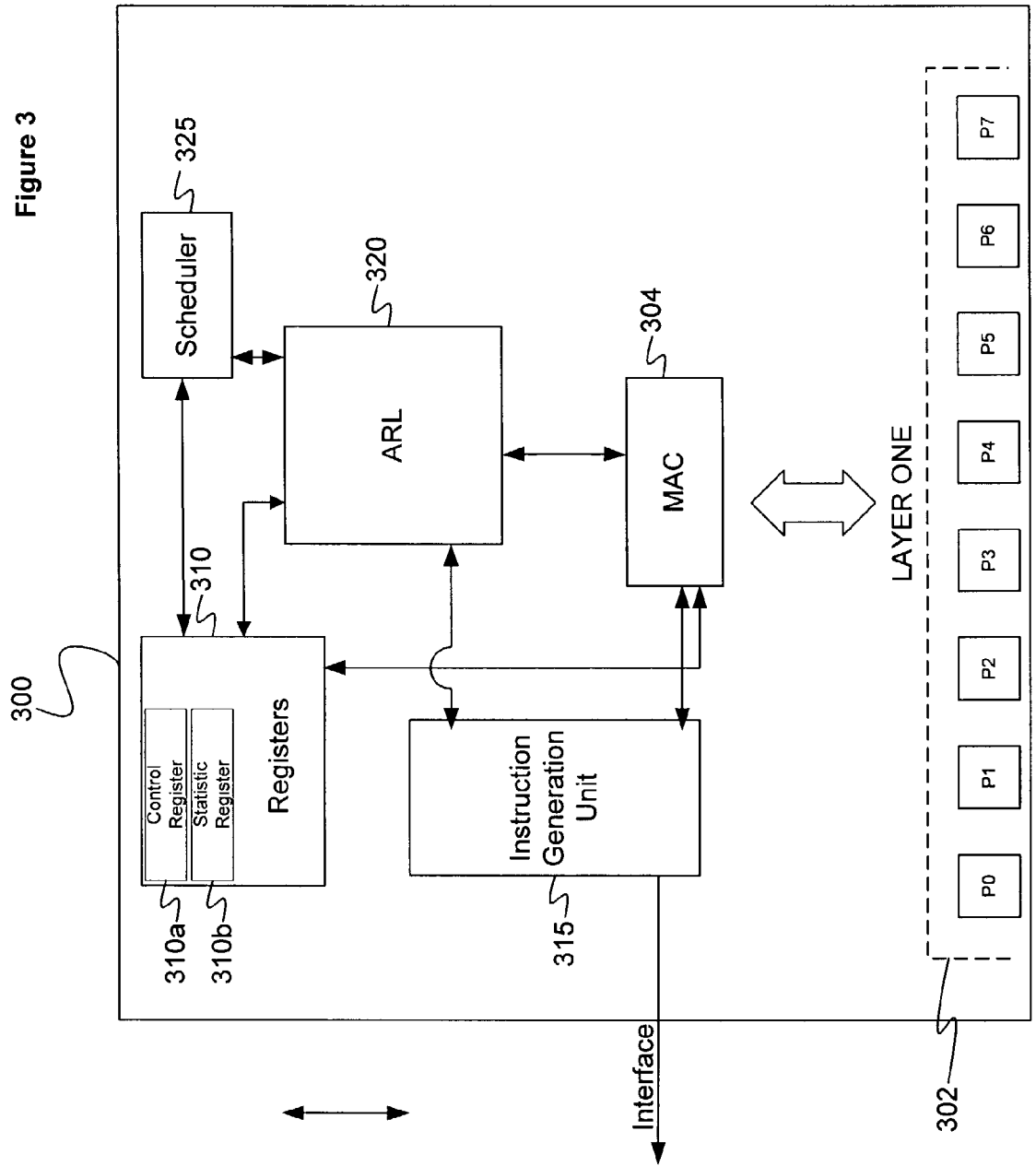
FIG. 3 is a block diagram of a packet forwarding device supporting MIB control frames in accordance with an embodiment of the invention.

FIG. 3 is a block diagram of an exemplary network device according to an embodiment of the invention, which provides an example of the control instruction generation feature of the invention. Device 300 may utilize and connect to a local area network (LAN), Wide Area network (WAN), or other networks such as the Internet and World Wide Web. Device 300 may include a number of network ports 302 (e.g., P0-P7), which may be well known PHYs or transceivers and perform Ethernet layer one functions. Network ports 302 are connected to network devices on one end, and to media access controller (MAC) 304 internally via an interface layer (not shown). MAC 304 represents an Ethernet layer-two system which interfaces the layer one systems with the upper layers of the device. MAC 304 may perform standard layer two functions in addition to those described herein.

Device 300 may also include a buffer, which connects to MAC 304, and is configured to temporarily store the MIB frames. The buffer may be any number of registers, SRAM, DRAM, or other memory storage device as necessary to perform networking functions. In this embodiment, the memory storage device is illustrated as registers 310. Registers 310 may include a single register or a plurality of registers, which store different types of information. For instance, registers 310 may include a statistical register 310a, an instruction or control register 310b or both. However, the invention is not limited to the example illustrated in this embodiment. Statistical register 310a may hold statistical information collected by network device 300. Instruction register 310b may hold instructions that may instruct any device on the network to carry out or perform an operation. For example, the instructions may be low level data, such as a set of bits, which are represented by a sequence of zeros and ones, that describes an operation that a network device should perform. The instructions may command a network device to perform such operations as to move data, compute arithmetic and logic functions, control input/output ports and devices, or make decisions as to which instructions to execute next. The instructions may be written or embedded into a data packet, which will be referred to as a "MIB frame."

Device 300 may also include an instruction generation unit 315, which connects to MAC 304 and registers 310 for producing control instructions, for example, according to commands entered by a user via a GUI interface. The instruction generation unit 315 may also write the MIB frame into registers 310. Device 300 may include address resolution logic (ARL) 320 for performing network functions, such as rate control, fast filter processing (FFP), congestion control, routing, learning, etc. Accordingly ARL 320 is connected to and may communicate with MAC 304 and the memory component, register 310. ARL 320 may also be configured to preread or snoop network ports 302 in order to perform or support a service differentiation scheme. Device 300 may include a scheduler 325, which may be attached to registers 310 or a separate subsystem. Scheduler 325 is configured to schedule or queue the MIB frames in registers 310. According to the invention, scheduler 325 is configured to identify the MIB frames, by its header, VLAN tag, etc., and schedule the MIB frames for transmission at each port based upon the priority of the data packet, the bandwidth allotted to the destination port, the order in which the packet was received, and/or the type of data packet. Device 300 may further include a number of interfaces for directly controlling the device. These interfaces may provide for remote access (e.g., via a network) or local access (e.g., via a panel or keyboard). Accordingly, device 300 may include external interface ports, such as USB or serial port, for connecting to external devices with network ports 302.

Figure 4:
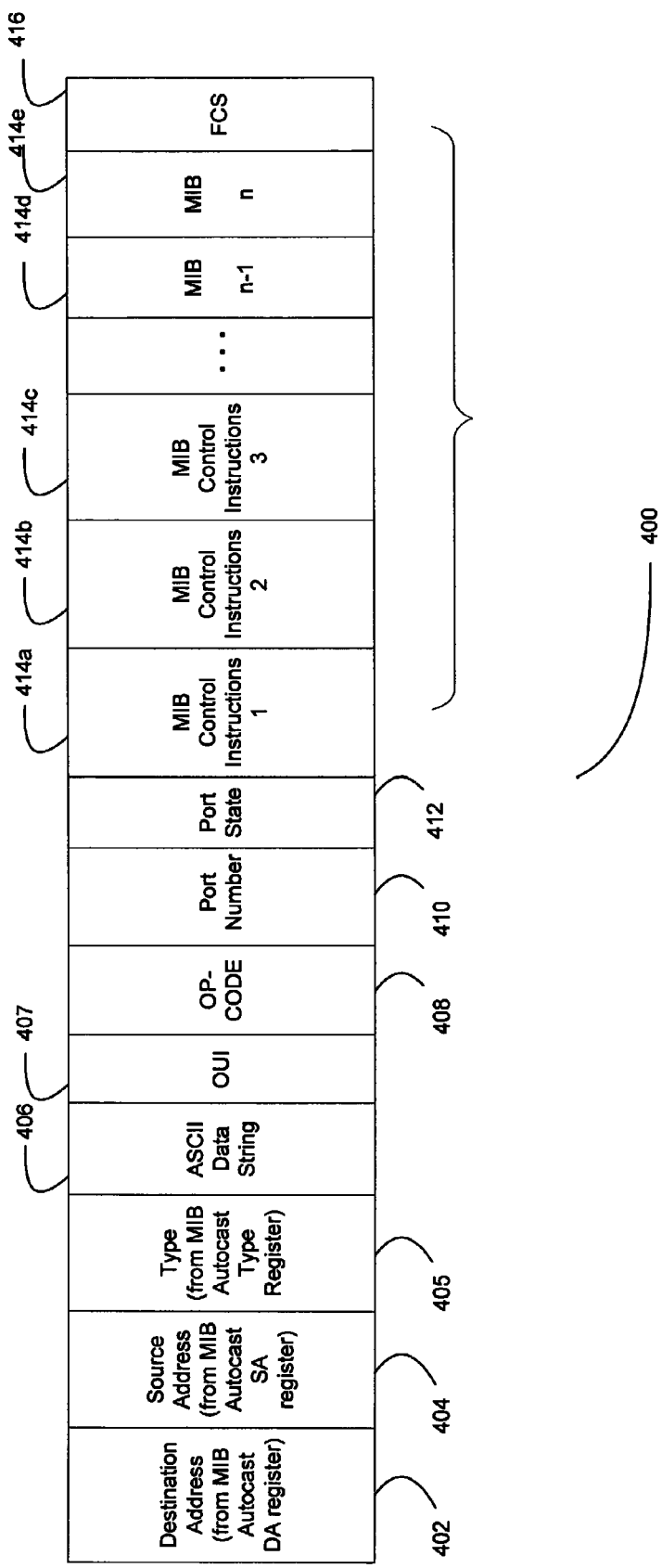
FIG. 4 is an example of a MIB control frame according to an embodiment of the invention.

FIG. 4 illustrates a general format of MIB Autocast frame as implemented by a switch device. Each MIB Autocast frame 400 may contain multiple fields which includes Destination Address field 402, Source Address field 404, Type field 405, ASCII data string 406, organizationally unique identifier (OUI) 407, OPCODE field 408, Port Number field 410, Port State field 412, MIB control fields 414a-414e, and FCS field 416. Each field can have extensions that permit extended information for expanded and scalable switch devices.

In one embodiment of the invention, fields within the MIB Autocast frame can be programmable, such as the Destination Address 402, Source Address 404, Frame type 405, etc. Some fields can be hard coded, such as, for example, OPCODE field 408. In addition, the order and content of the frame with respect to the actual fields/MIB counters that are compacted together to make frame 400, can be hard coded. OPCODE field 408 allows simple two-way communication between a remote client or management system and the MIB Autocast function (engine) in the hub or switch device. In one embodiment of the invention, organizationally unique identifier (OUI) 407 in packet 400 allows the packet to be identified as a management (push), or MIB Autocast, frame.

The hub (similar to hub 100 in FIG. 1, or switch device 200 in FIG. 2) can construct frame 400 of the general format shown in FIG. 4, on a periodic basis or on an as-needed basis. The period can be programmable to generate and transmit the control instruction, while not generating excessive network traffic. Accordingly, the invention may be configured so that the control instructions are generated only during a specific time period. However, the invention may also be configured to override the programmed time period so that a control instruction may be generated and transmitted on an as-needed basis. At each programmed time period, the hub generates the control information for the respective attached network device, and constructs a MIB frame containing this port-specific information. These control information can be representative of, for example, an instruction that modifies a control operation of the network device. A copy of the frame representative of a respective port then can be transmitted, or "cast" to each respective output port in the switch.

The hub can recognize frames 400 based on the destination address of the frame, for example, if the destination address is addressed to the network device's specific MAC addresses. Based on the content of the frame (e.g., OP CODE, etc.), these frames may be handled by the device itself or may be routed to the management entity 110 as indicated in FIG. 1. In this case, as shown in FIG. 2, the single MAC address assigned to the switch 200 can be installed in the address resolution logic 204 as a static entry, with the egress port 208 identified as the Serial Management Port. The device 200 or management system 110 then can operate on this frame 400, to determine if the packet is a "MIB Autocast configuration message" depending upon Type field 306 and OPCODE field 308. If the data packet is an MIB autocast frame, the network device can take appropriate action to reconfigure the network device.

Instructions can be inserted into MIB control fields 414a-414e of MIB frame 400 so that when frame 400 is transmitted to, received at and processed by another network device that the frame updates and modifies the operation of the receiving network device. For instance, instructions can be written into the MIB frame to instruct a device to move, transmit, receive or drop data. The MIB frame may also be configured to control a network device by instructing the network device to shut down or initiate a particular port or a group of ports. An MIB frame may also be generated to update the service level agreement (SLA) terms negotiated between two entities of the network. A client or subscriber may decide to alter the terms of its SLA in order to receive an improved quality of service (QOS). The client or subscriber may renegotiate its SLA to pay more to receive 10 MHZ/sec at a particular port. Thus, an MIB frame may be constructed on a network device and transmitted to one or more network devices to implement this change.

Instructions may also be written to create or alter a flow control scheme of a network device. If a network device is currently operating in, for example, a round robin fashion, which involves "taking turns" to control data flow, an MIB frame may be generated and transmitted to the network device to change the current data flow scheme to or to add the capabilities of a fair-weighted queuing data control scheme, which controls the ratio of transmission of the data packets based upon bandwidth allocation. Instructions may also be written to assist a network device when a problem, such as congestion, arises within the network. The network device may generate an MIB frame, which contains instructions as to which ports packets should be dropped from during congestion.

Instructions can furthermore be written to reconfigure the topology or the physical layout of the network. For instance, instructions can be written that instructs certain network devices to add or delete a network device to the network. Instructions can also be written to promote or demote the priority or security level of a network device within the network.

Figure 5:
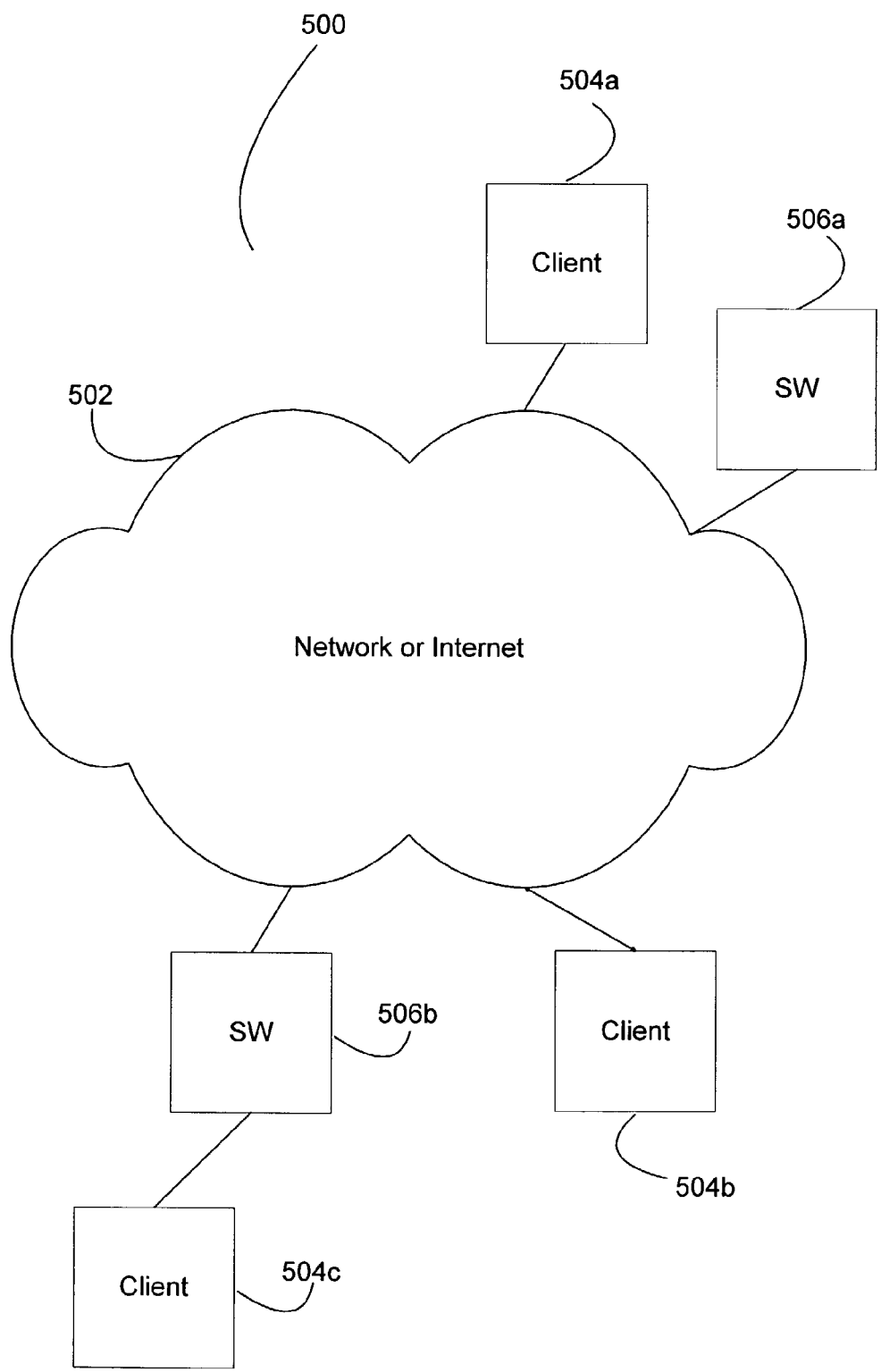
FIG. 5 is a second block diagram of a network including a network device supporting MIB control frames in accordance with an embodiment of the invention.

FIG. 5 is a block diagram of an exemplary network according to the invention. Network 500 may include clients 504a-504c which are connect to a network such as the Internet 502. Clients may be connected to the Internet 502 via a switch 506a or 506b, or via other network devices (not shown). According to an embodiment of the invention, switches 506a-506b may be configured to perform MIB autocast functions as described above. Any of clients 504a-504c may be configured to generate and transmit an MIB frame to either switch 506a or 506b in order to manage the configuration thereof. Since the configuration is performed via an MIB frame, which may be an Ethernet frame, any client configured to generate such a frame may configure any switch configured to perform MIB autocast functions according to the invention. For example, client 504c may configure switch 506a by addressing the frame to switch 506a, even though client 504c is not connected directly to switch 506a. Moreover, by providing low level data to be updated in the switch 506a, client 504c can configured and manage the ports of switch 506a remotely and without shutting down switch 506a.

Figure 6:
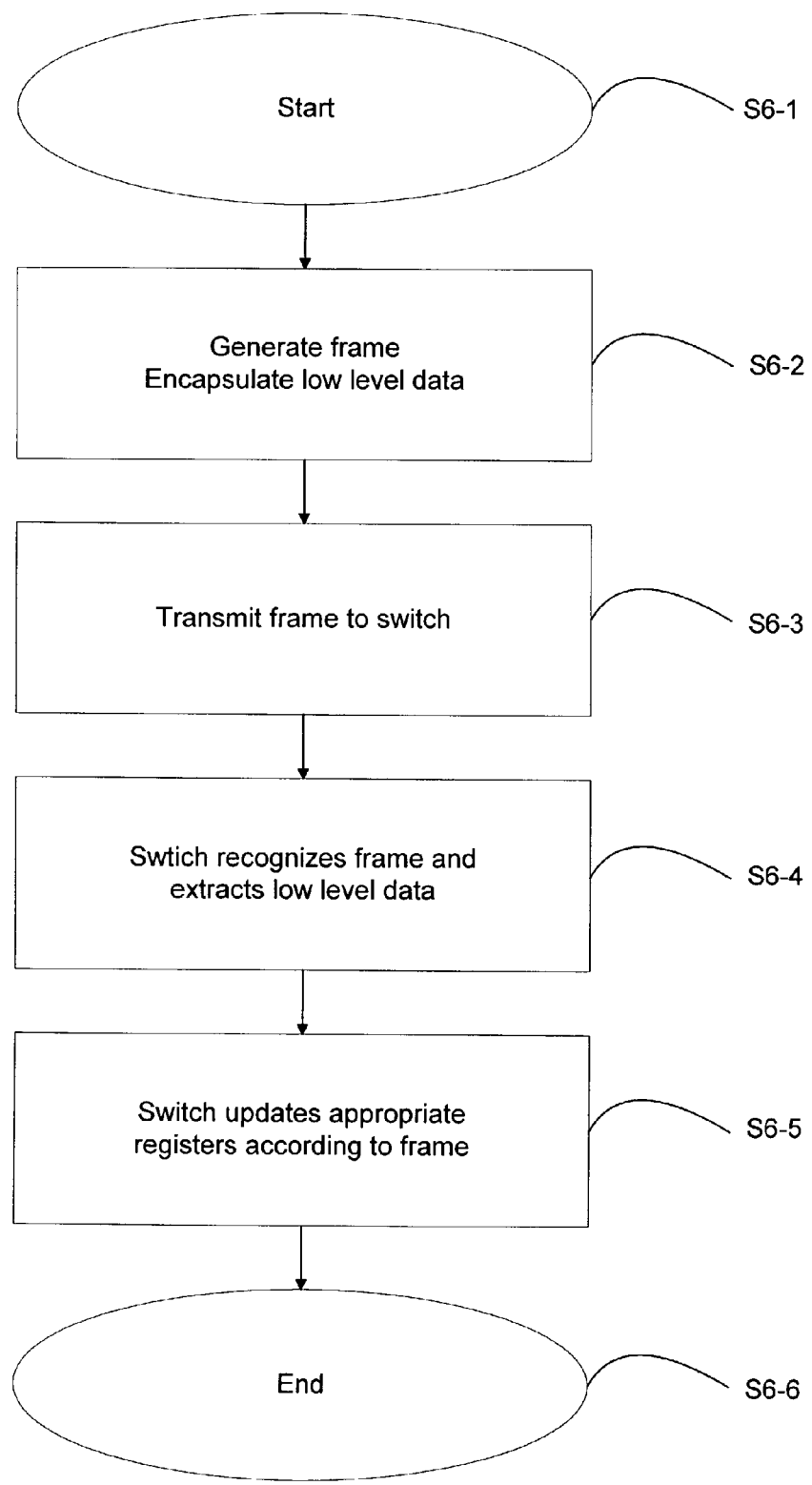
FIG. 6 is flowchart of a method for MIB control frames according to an embodiment of the invention.

FIG. 6 is a flow chart of a method for remotely configuring a network device according to an embodiment of the invention. In a network system where network devices configured to perform MIB functions according to the invention are connected to a LAN, WAN or to the Internet, a network client may be connect to the same network and configured to generate an MIB frame. At step S6-2, the client may generate an MIB frame or Ethernet frame having an destination address for the network device to be configured, and containing instructions and low level data for performing the desired management functions, such as PHY management. The frame may be such as the MIB frame described above with reference to FIG. 4.

At step S6-3, the frame is transmitted across the network to the device to be configured. At step S6-4, the device to be configured receives the frame, recognizes that it is an MIB frame, such as by the destination address and/or OUI (Organizationally Unique Identifier) field, and extracts the low level data and instructions. The extraction may be made by a network information receiving unit that is configured to read an MIB frame and extract instructions and data. At step S6-5, the device updates the appropriate registers in the device to make the requested configuration changes. As described, a network information receiving unit or MIB engine may perform the updates to the appropriate registers. Also, optionally, the network device may then perform an MIB autocast to report the changes that have been made.

One having ordinary skill in the art will understand that a network device may be configured to perform the above-described method either in silicon or in software. Accordingly, one will understand that the switching configurations described herein are merely exemplary. Accordingly, although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

I claim:

1. A network device comprising:
a network port configured to send and receive data packets;
at least one register containing configuration data related to said network port; and
a network information receiver coupled with said network port and configured to receive the data packet from said network port, extract low level data from said data packet, and update said at least one register based on said low level data, wherein said network information receiver is configured to extract data from said data packet if said data packet is addressed to a MAC address of said network device.

2. The network device as recited in claim 1, further comprising:
a network information transmitter coupled with said network port and configured to collect data from registers of said network device, generate a data packet containing said data collected from said network device, and transmit a data packet containing said data collected from said network device to said network port.

3. The network device as recited in claim 1, wherein said network information receiver is configured to update registers which configure said network port based upon said data packet received.

4. The network device as recited in claim 1, wherein said network information receiver is configured to update registers to modify a control operation of said network device.

5. The network device as recited in claim 1, wherein said network information receiver is configured to update registers to control a reception operation of said data packets at said port.

6. The network device as recited in claim 1, wherein said network information receiver is configured to update registers to control a reception operation of said data packets at said port.

7. The network device as recited in claim 1, wherein said network information receiver is configured to update registers to control a quality of service treatment provided to said data packets of said network device.

8. The network device as recited in claim 1, wherein said network information receiver is configured to update registers to control said port to modify a topology of said network.

9. The network device as recited in claim 1, wherein said network device comprises a switch.

10. The network device as recited in claim 1, wherein said network device comprises a router.

11. The network device as recited in claim 1, wherein said network device comprises a hub.

12. A network device comprising:
a network port configured to send and receive data packets;
at least one register containing configuration data related to said network port; and
a network information receiver coupled with said network port and configured to receive the data packet from said network port, extract low level data from said data packet, and update said at least one register based on said low level data, wherein said network device is configured to send a message to a client when said update to said registers is complete.

13. The network device as recited in claim 12, further comprising:
a network information transmitter coupled with said network port and configured to collect data from registers of said network device, generate a data packet containing said data collected from said network device, and transmit a data packet containing said data collected from said network device to said network port.

14. The network device as recited in claim 12, wherein said network information receiver is configured to update registers which configure said network port based upon said data packet received.

15. The network device as recited in claim 12, wherein said network information receiver is configured to update registers to modify a control operation of said network device.

16. The network device as recited in claim 12, wherein said network information receiver is configured to update registers to control a reception operation of said data packets at said port.

17. The network device as recited in claim 12, wherein said network information receiver is configured to update registers to control a reception operation of said data packets at said port.

18. The network device as recited in claim 12, wherein said network information receiver is configured to update registers to control a quality of service treatment provided to said data packets of said network device.

19. The network device as recited in claim 12, wherein said network information receiver is configured to update registers to control said port to modify a topology of said network.

20. The network device as recited in claim 12, wherein said network device comprises a switch.

21. The network device as recited in claim 12, wherein said network device comprises a router.

22. The network device as recited in claim 12, wherein said network device comprises a hub.

23. A method of configuring a network device, said method comprising:

generating a data packet containing network device configuration information and sending said data packet to said network device;
receiving said data packet and extracting said network device configuration information;
updating register data based on said network configuration information; and
controlling said network device configuration according to said register data.

24. The method as recited in claim 23, wherein said step of generating a data packet includes addressing said data packet for a MAC address of said network device, and said step of receiving said data packet includes extracting said network device configuration information if a destination address of said data packet is said MAC address of said network device.

25. The method as recited in claim 23, wherein said generating a data packet step includes collecting low level data from registers of said network device and inserting said low level data into said data packet.

26. The method as recited in claim 23, wherein said controlling step includes extracting low level from said data packet if said data packet is addressed to a MAC address of said network device.

27. A network device comprising:
a port for sending and receiving input data
a data storage means for containing configuration data related to said port, said data storage means comprising at least one register; and
an information receiving means for receiving a data packet from said port, wherein said information receiving means is configured to extract low level data from said data packet, and update said at least one register based on said low level data, wherein said information receiving means is configured to extract low level data from said data packet if said data packet is addressed to a MAC address of said network device.

28. The network device as recited in claim 27, further comprising:
an information transmitting means coupled with said port and configured to collect low level data from registers of said network device, generate a data packet containing said low level data collected from said network device, and transmit said data packet to said network port.

29. The network device as recited in claim 27, wherein said information receiving means is configured to update registers which configure said port based upon said data packet received.

30. A network device comprising:
a port for sending and receiving input data
a data storage means for containing configuration data related to said port, said data storage means comprising at least one register; and
an information receiving means for receiving a data packet from said port, wherein said information receiving means is configured to extract low level data from said data packet, and update said at least one register based on said low level data, wherein said network device is configured to send a message to a client when said update to said registers is complete.

31. A network device comprising:
a network port configured to send and receive data packets;
at least one register containing configuration data related to said network port; and
a network information receiver coupled with said network port and configured to receive the data packet from said network port, extract low level data from said data packet, and update said at least one register based on said low level data, wherein said network information receiver is configured to update registers to control a parameter of said network device which is governed by a service level agreement.

32. A network device comprising:

a network port configured to send and receive data packets;

at least one register containing configuration data related to said network port; and a network information receiver coupled with said network port and configured to receive the data packet from said network port, extract low level data from said data packet, and update said at least one register based on said low level data, wherein said network information receiver is configured to update registers to control a flow control scheme configured within said network device to mitigate congestion.

* * * * *